United States Patent
Park et al.

(10) Patent No.: US 7,986,283 B2
(45) Date of Patent: Jul. 26, 2011

(54) MULTI-DIMENSIONAL IMAGE SELECTABLE DISPLAY DEVICE

(75) Inventors: Ji-eun Park, Suwon-si (KR); Kyung-ho Choi, Suwon-si (KR)

(73) Assignee: Samsung Mobile Display Co., Ltd., Suwon-si, Gyeonggi-do (KR)

(*) Notice: Subject to any disclaimer, the term of this patent is extended or adjusted under 35 U.S.C. 154(b) by 927 days.

(21) Appl. No.: 11/896,983

(22) Filed: Sep. 7, 2007

(65) Prior Publication Data
US 2008/0007566 A1 Jan. 10, 2008

(30) Foreign Application Priority Data
Jan. 2, 2007 (KR) .................. 10-2007-0000368

(51) Int. Cl.
*G09G 3/00* (2006.01)
(52) U.S. Cl. ............. 345/32; 345/6; 345/7; 345/87; 345/109; 359/462
(58) Field of Classification Search .............. 345/6, 7, 345/32, 87, 109; 359/462
See application file for complete search history.

(56) References Cited

U.S. PATENT DOCUMENTS

| | | | |
|---|---|---|---|
| 5,969,850 A * | 10/1999 | Harrold et al. | 359/320 |
| 6,005,650 A * | 12/1999 | Kim et al. | 349/130 |
| 7,201,955 B2 | 4/2007 | MacMaster | |
| 2003/0063186 A1* | 4/2003 | Tomono | 348/51 |
| 2006/0098281 A1* | 5/2006 | Fukushima et al. | 359/464 |
| 2006/0132681 A1* | 6/2006 | Park et al. | 349/113 |
| 2006/0145976 A1* | 7/2006 | Tsai et al. | 345/87 |
| 2006/0215262 A1* | 9/2006 | Kim | 359/465 |
| 2007/0058113 A1* | 3/2007 | Wu et al. | 349/106 |
| 2007/0188517 A1 | 8/2007 | Takaki | |

FOREIGN PATENT DOCUMENTS

| | | |
|---|---|---|
| KR | 10-2004-0026237 A | 3/2004 |
| KR | 10-2004-0058843 A | 7/2004 |
| KR | 10-2004-0078622 A | 9/2004 |
| KR | 10-2005-0050589 | 5/2005 |
| KR | 10-2006-0022883 A | 3/2006 |
| KR | 10-2006-0114561 | 11/2006 |
| KR | 10-2006-0126833 | 12/2006 |

* cited by examiner

*Primary Examiner* — Alexander Eisen
*Assistant Examiner* — Viet Pham
(74) *Attorney, Agent, or Firm* — Lee & Morse, P.C.

(57) ABSTRACT

Example embodiments relate to a multi-dimensional image selectable display device having an image panel adapted to output an image, and a barrier panel at an upper-side portion of the display device so as to display the image as a two dimensional image or a three dimensional image. The barrier panel may include a first substrate having a first electrode and a second electrode arranged so as to apply a horizontal between the first and second electrodes, a second substrate, and a liquid crystal layer between the first and second substrates. A phase delay value $\Delta n*d$ may range from approximately 700 to 800 nm, wherein the phase delay value $\Delta n*d$ may be a product of a double refraction value $\Delta n$ of a liquid crystal constituting the liquid crystal layer, and a cell gap d between the first and second substrates.

20 Claims, 7 Drawing Sheets

MULTI-DIMENSIONAL IMAGE SELECTABLE DISPLAY DEVICE

BACKGROUND OF THE INVENTION

1. Field of the Invention

Example embodiments relate to a display device, and more particular, to a multi-dimensional image selectable display device.

2. Discussion of the Related Art

In general, a three dimensional (3D) image for expressing three dimensional information may be achieved by a stereo visual principle, for example. One factor in 3D feeling may rely on binocular parallax because the two eyes may be spaced apart from each other, in most cases, by approximately 65 mm. That is, two left and right eyes may view two different two dimensional (2D) images. The two images may be transferred to a brain through the eye, e.g., a retina. The brain may perceive the two images to reproduce depth and real feeling of 3D images.

Accordingly, methods to display 3D images may be one of a special spectacle method, a non-spectacle type 3D display method, and a holographic display method.

The special spectacle method may be divided into a polarized spectacle method, a time division spectacle method and a concentration difference method. The polarized spectacle method may use vibration direction or rotating direction of a polarized light. The time division spectacle method may provide left and right images in alternate way. The concentration difference method may transfer lights of different brightness to the left and right eyes.

The non-spectacle type 3D display method may be divided into a parallax method, a lenticular method, and an integral photography method. The parallax method may cause a user to divide and observe images through a longitudinal lattice shaped aperture in front of respective images corresponding to left and right eyes. The lenticular method may use a lenticular plate. The integral photography method may use a fly's eye lens sheet.

The holographic display method may obtain 3D images, which may include all factors, e.g., focus adjustment, convergence angle, binocular parallax, and motion parallax for providing 3D feeling. The holographic display method may be classified into a laser beam play hologram method and a white light play hologram method.

In the special spectacle method, many users perceive 3D images, but must wear polarized spectacles or liquid crystal shutter spectacles to view the 3D images. This may result in inconvenience and feeling uncomfortable as the user has to wear a special spectacle.

In the non-spectacle type 3D display method, because an observed range may be fixed, only a small number of users may view the image. However, users prefer the non-spectacle type 3D display method over other methods because it may not be necessary to wear special spectacles. Further, in the non-spectacle type 3D display method, the observer may directly gaze into the screen.

In the holographic display method to display 3D images, the holographic display method may display images of 3D coordinates on a space through a laser, lens, and a mirror so that the user may perceive existing objects. However, the holographic display method may be restrictive due to difficulty in operating and limited space requirement, e.g., large space occupied by equipment.

Accordingly, there may be a strong trend of using the parallax-barrier, which may virtually embody 3D images by deceiving a viewer using stereo images. The parallax barrier may be disposed in front of an image corresponding to the left and right eyes in longitudinal or transverse patterns (i.e., slit). The user may then separately observe the 3D images composed through the slit to perceive a 3D feeling.

FIG. 1 illustrates a view of 3D images embodied by a conventional barrier type 3D display device.

Referring to FIG. 1, a barrier panel 20 may be arranged in front of an image panel 30. The barrier panel 20 may be formed by alternately arranging slits (indicated as open) and barriers (indicated as blocked). The slits and the barriers may pass and block light output from the image panel 30, respectively.

Accordingly, an observer 10 may view images displayed or printed to the image panel 30 through the slits of the barrier panel 20. Here, left and right eyes of the observer 10 may view different regions of the image panel 30 through the same slit. Further, the left and right eyes may view images corresponding to pixels of different regions through a slit, thereby perceiving a feeling of 3D (a parallax barrier method may use such a principle). That is, the left eye L may view a left eye corresponding pixel Lp on the image panel 30, and the right eye R may view a right eye corresponding pixel Rp on the image panel 30.

However, in the conventional parallax barrier type 3D display device, a user cannot view a general 2D image because a panel may be installed in front of the image panel 30. Accordingly, in order to view 2D images, the barrier panel 20 should be removed.

SUMMARY OF THE INVENTION

Example embodiments are therefore directed to display apparatus, which substantially overcome one or more of the problems due to the limitations and disadvantages of the related art.

It is therefore a feature of an exemplary embodiment to provide a multi-dimensional image selectable display device, which may switch between a wide viewing angle and a narrow viewing angle during 2D display operation.

It is therefore another feature of an exemplary embodiment to provide a multi-dimensional image selectable display device, which may change from a 2D to a 3D display by orienting a liquid crystal layer formed in a barrier panel in an electrically controlled birefringence (ECB) mode, arranging first and second electrodes to form a horizontal electric field at a first substrate, and forming a transparent electrode at a front surface of a second substrate.

It is therefore yet another feature of an exemplary embodiment to provide a multi-dimensional image selectable display device, which may embody an effective narrow viewing angle mode by optimizing a phase delay value Δn*d of a barrier panel during a narrow viewing angle 2D image.

At least one of the above and other features of example embodiments may provide a multi-dimensional image selectable display device having an image panel adapted to output an image, and a barrier panel at an upper-side portion of the display device so as to display the image as a two dimensional image or a three dimensional image. The barrier panel may include a first substrate having a first electrode and a second electrode arranged so as to generate a horizontal electric field between the first and second electrodes, a second substrate, and a liquid crystal layer between the first and second substrates. A phase delay value Δn*d may range from approximately 700 to 800 nm, wherein the phase delay value Δn*d may be a product of a double refraction value Δn of a liquid crystal constituting the liquid crystal layer and a cell gap d between the first and second substrates.

The first electrode may include a plurality of pattern units, each of the pattern units may be divided into a plurality of fine patterns. The second electrode may include a plurality of pattern units, each of the pattern units may be divided into a plurality of fine patterns.

The barrier panel includes a transparent electrode formed at a front surface of the second substrate to provide a 2D/3D conversion. The barrier panel is between the image panel and an observer.

The first substrate may be divided into a first region functioning as a barrier and a second region functioning as a slit when a voltage is applied to the first electrode and the second electrode to form the horizontal electric field. The first region and the second region may be arranged at intervals.

The multi-dimensional image selectable display device may further include a first orientation film and a second orientation film. The first and second orientation films may be formed at inner sides of the first and second substrates, respectively. The first and second orientation films may be anti-parallel rubbed to initially orient the liquid crystal layer in an electrically controlled birefringence mode.

The image panel may be embodied by at least one of a liquid crystal display device, a plasma display panel device, and an organic light emitting display device.

The barrier panel may selectively display two and three dimensional images according to whether a potential difference is applied to the first and second electrodes of the first substrate to form the horizontal electric field. The three dimensional image may be displayed when the horizontal electric field is formed.

The barrier panel may display the two dimensional image of a wide viewing angle or a narrow viewing angle according to whether a voltage is applied to the electrodes of the first and second substrates to form a vertical electric field. The two dimensional image of the narrow viewing angle may be displayed when the vertical electric field is formed.

The multi-dimensional image selectable display device may provide a pair of pattern units of the first electrode adjacent to each other so that the fine patterns of each pattern unit may be alternately arranged. When the horizontal electric field is not applied between the pair of pattern units of the first electrode and the fine pattern, the liquid crystal disposed at an upper part thereof may not be distorted so as to allow light to pass through the liquid crystal layer.

The multi-dimensional image selectable display device may provide the pattern unit of the first electrode and the pattern unit of the second electrode being adjacent to each other so that the fine patterns of the pattern units of the first and second electrodes may be alternately arranged. When the horizontal electric field is applied between the pattern units of the first electrode and the second electrode, and the fine patterns, the liquid crystal disposed at an upper part thereof may be distorted so as to not block light.

The vertical electric field may distort the liquid crystal at an angle. The angle may be formed approximately 45 degrees.

BRIEF DESCRIPTION OF THE DRAWINGS

The above and other features and advantages of example embodiments will become more apparent to those of ordinary skill in the art by describing in detail example embodiments thereof with reference to the attached drawings, in which.

DETAILED DESCRIPTION OF THE INVENTION

Figure 1:
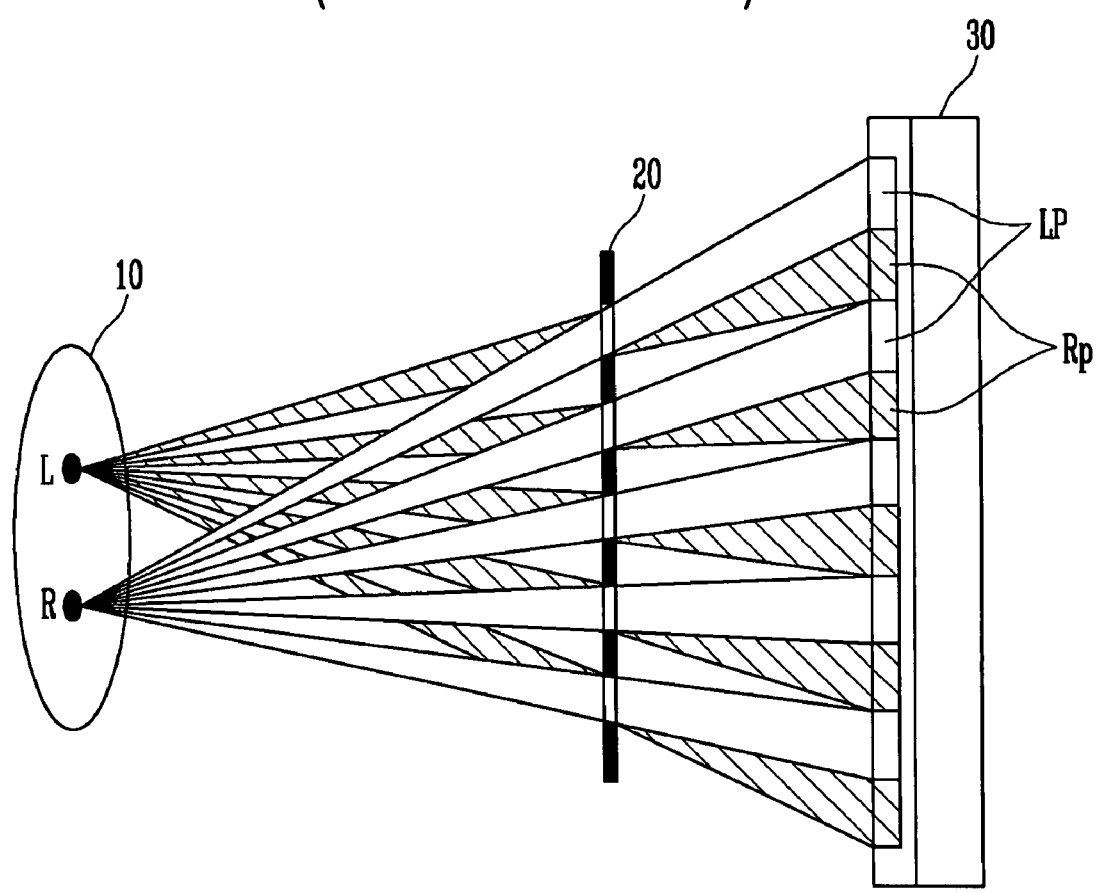
FIG. 1 illustrates a view of a 3D image embodied by a conventional barrier type 3D display device.

Korean Patent Application No. 10-2007-0000368, filed on Jan. 2, 2007, in the Korean Intellectual Property Office, and entitled: "Two and Three Dimensional Image Selectable Display Device," is incorporated by reference herein in its entirety.

Example embodiments will now be described more fully hereinafter with reference to the accompanying drawings. The invention may, however, be embodied in different forms and should not be construed as limited to the embodiments set forth herein. Rather, these example embodiments are provided so that this disclosure will be thorough and complete, and will fully convey the scope of the invention to those skilled in the art.

In the figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

Figure 2:
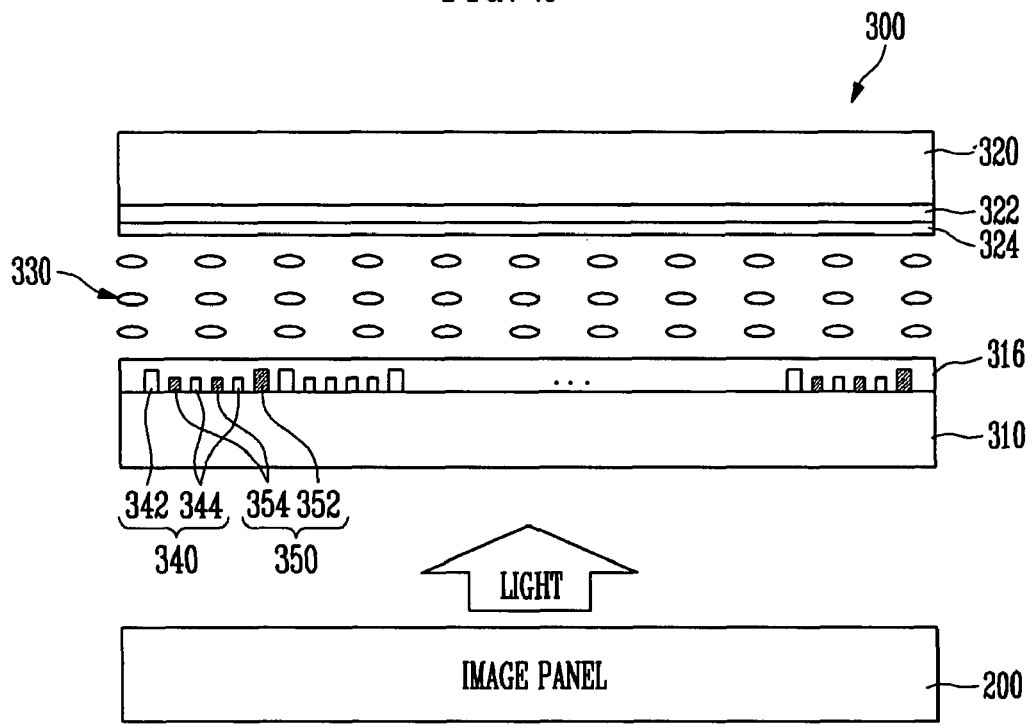
FIG. 2 illustrates a cross-sectional view of a display device according to an example embodiment.

FIG. 2 illustrates a cross-sectional view of a display device according to an example embodiment.

Referring to FIG. 2, the display device a may include an image panel 200 and a barrier panel 300.

The image panel 200 may be embodied as a liquid crystal display (LCD) device, a plasma display panel (PDP) display, an organic light emitting diode (OLED) display, etc. In an example embodiment, a LCD will be described herein.

The barrier panel 300 may include a first substrate 310, a second substrate 320, and a liquid crystal layer 330. The liquid crystal layer 330 may be formed between the first substrate 310 and the second substrate 320. The liquid crystal layer 330 may initially be oriented in an electrically controlled birefringence (ECB) mode, for example. An in-plane-switching type electrode, e.g., first and second electrodes 340 and 350, may be arranged on the first substrate 310 to form a horizontal electric field. A transparent electrode 322 may be formed at a front surface of the second substrate 320 to provide a 2D/3D conversion. For example, during 2D display operation, a switching of a wide viewing angle and a narrow viewing angle may be operated.

Further, a first orientation film 316 and a second orientation film 324 may be formed at inner sides of the first and second substrates 310 and 320, respectively. The first and second orientation films 316 and 324 may be anti-parallel rubbed to initially orient the liquid crystal layer 330 in the ECB mode.

The image panel 200 may selectively display 2D and 3D images. When the 3D image is displayed, a left pixel L and a right pixel R may be alternately formed. The left pixel L may display a left image information and the right pixel R may display a right image information.

The barrier panel 300 may be disposed between the image panel 200 and an observer, in which the barrier panel 300 may transmit and/or block light. When the 2D image is displayed, the barrier panel 300 may operate to transmit an image output from the image panel 200. When the 3D image is displayed, the observer may view a virtual 3D image through a slit and a barrier. The slit and the barrier may pass and block light discharged from the right pixel R and the left pixel L, respectively. In other words, when the 3D is displayed, the barrier panel 300 may operate by alternately forming the slit and the barrier in a vertical manner.

Further, when the horizontal electric field is applied between the first and second electrodes 340 and 350, the barrier panel 300 may obtain the same effects as in the case when the slit transmits light and the barrier blocks light arranged at predetermined intervals, so as to allow 3D image to be perceived.

The first electrode 340 and the second electrode 350 may include a plurality of pattern units 342 and 352. Each of the pattern units 342 and 352 may be constructed so that a plurality of fine patterns 344 and 354 may extend therefrom. It should be appreciated that other arrangements may be embodied to form the first electrode 340 and the second electrode 350.

Figure 4:
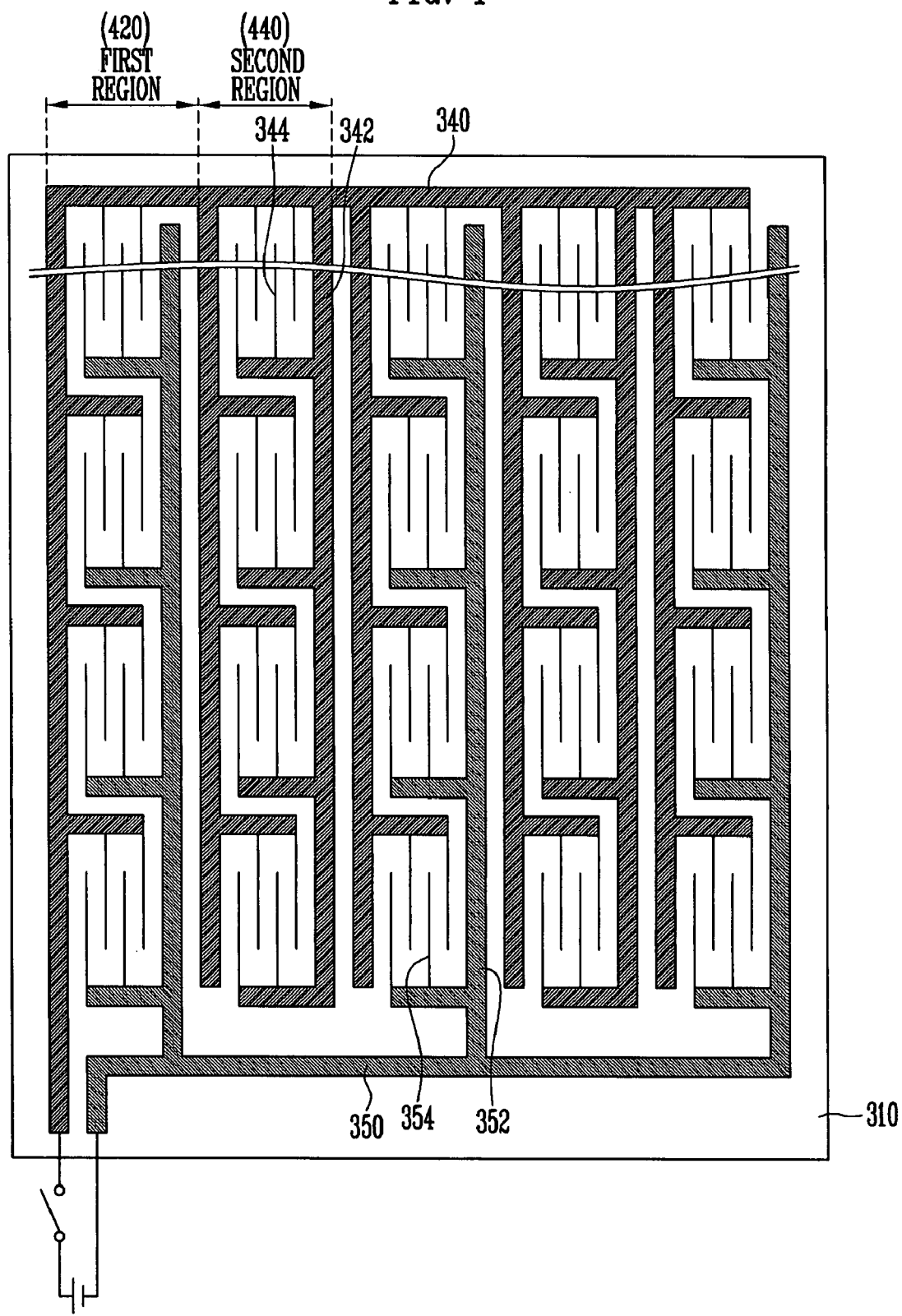
FIG. 4 illustrates a plan view of an example of an arrangement of a first electrode and a second electrode, which may be formed on a first substrate of the barrier panel shown in FIG. 3.

Further, a pair of pattern units 342 of the first electrode 340 may be adjacent to each other. Each of the pattern units 342 may include fine patterns 344, which may be alternately arranged. In addition, the pattern unit 342 of the first electrode 340 and the pattern unit 352 of the second electrode 350 may be adjacent thereto, and the fine patterns 344 and 354 of the pattern units 342 and 352 may be alternately arranged (as shown in FIG. 4).

Accordingly, because the horizontal electric field may not be formed between the pair of pattern units 342 of the first electrode 340 and the fine pattern 344 (in which a same power source may be applied), the liquid crystal layer 330 disposed at an upper part thereof may not be distorted. As a result, light may directly pass through the liquid crystal layer 330, and the region may function as a slit.

Further, when the horizontal electric field is formed between the pattern units 342 and 352 of the first electrode 340 and the second electrode 350 and the fine patterns 344 and 354, the liquid crystal layer 330 disposed at an upper part thereof may be distorted. As a result, the light may not pass through the liquid crystal layer 330, and the region may function as a barrier.

Now, a 3D image display method embodied by the aforementioned display device will be described in detail. For example, light oriented to an observer's left eye may pass through a slit of the barrier panel 300 from a left pixel L of the image panel 200, and may reach the observer's left eye. However, light directed to the observer's right eye from the left pixel L of the image panel 200 may be blocked by the barrier panel 300, i.e., may not be viewed by the observer.

Next, light oriented to the observer's right eye may pass through a slit of the barrier panel 300 through a right pixel R of the image panel 200, and may reach the observer's right eye. However, although the light may pass through the right pixel R of the image panel 200, light directed to the observer's left eye may be blocked by the barrier panel 300, i.e., may not be viewed by the observer.

Accordingly, the light output by the left pixel L may be transferred to only the observer's left eye, and the light output by the right pixel R may be transferred to only the observer's right eye, so that the observer may recognize the image. Accordingly, sufficient viewing information may be formed between light reaching the left eye and light reaching the right eye. As a result, the observer may view 3D images.

Further, when 2D images are embodied, the barrier panel 300 may operate in two modes. For example, when a predetermined electric field is not formed between the electrodes included on the first and second substrates 310 and 320 of the barrier panel 300, the liquid crystal layer 330 formed in the barrier panel 300 may be arranged corresponding to a transmission axis of a polarizing plate (not shown). The polarizing plate may be included on the image panel 200 so as to embody a wide viewing angle with respect to 2D images. However, when the predetermined electric field, e.g., a vertical electric field, is formed between the electrodes included on the first and second substrates 310 and 320 of the barrier panel 300, the liquid crystal layer 330 may be vertically distorted at a predetermined angle, so that an average slope of the liquid crystal layer 330 in a slope direction may form approximately 45 degrees with respect to the transmission axis of the polarizing plate included on the image panel 200. The image panel 200 may normally have a front surface of white characteristics. However, black images may appear so that the observer may not view the images to embody a narrow viewing angle.

In an example embodiment, an optimal range of a phase delay value may be calculated by an equation of $\Delta n*d$, which may be set to embody a more effective narrow viewing angle mode with the 2D images.

The $\Delta n$ may be a double refraction value of a liquid crystal constituting the liquid crystal layer 330, and d may be a cell gap between the first and second substrates 310 and 320.

When the phase delay value $\Delta n*d$ ranges from approximately 700 to 800 nm, an optimal narrow viewing angle mode may be embodied.

Figure 3:
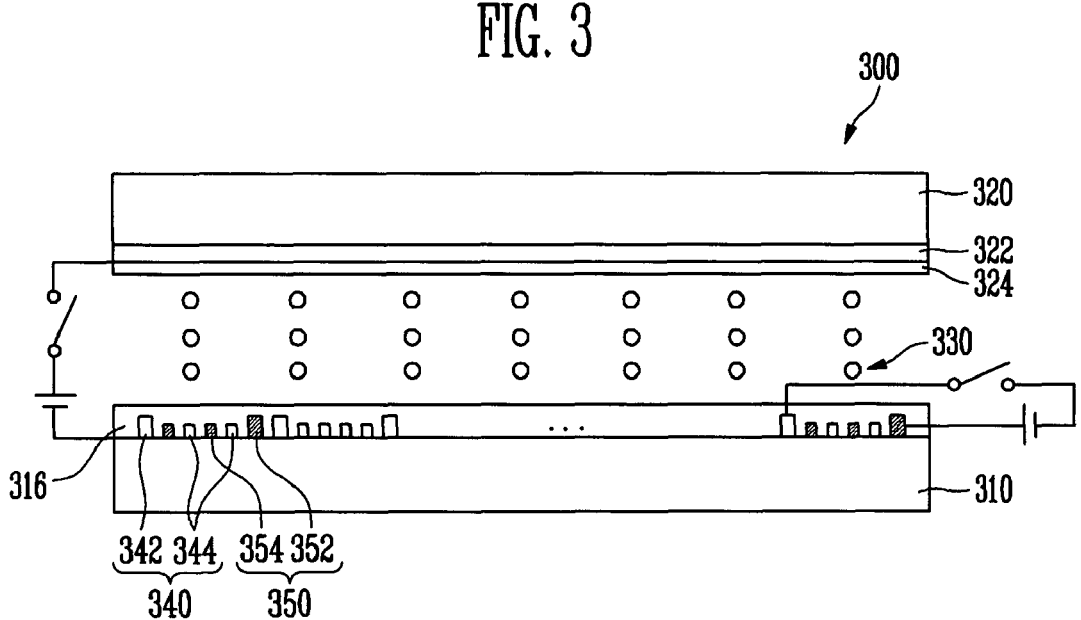
FIG. 3 illustrates a cross-sectional view of a barrier panel shown in FIG. 2.

FIG. 3 illustrates a cross-sectional view of the barrier panel 300 shown in FIG. 2; and FIG. 4 illustrates a plan view of an example embodiment of an arrangement of the first electrode 340 and the second electrode 350, which may be formed on the first substrate 310 of the barrier panel 300 shown in FIG. 3.

In an example embodiment, the barrier panel 300 may be disposed between the image panel 200 and the observer, and may function to transmit and/or block light. When the 2D images are displayed, the barrier panel 300 may operate to pass entire images output from the image panel 200. When the 3D images are displayed, 3D virtual images may be provided to the observer through the slit for passing the light and the barrier for blocking the light output from the right pixel R and the left pixel L of the image panel 200.

Thus, the barrier panel 300 may selectively display 2D or 3D images according to whether or not a predetermined potential difference is applied between the first and second electrodes 340 and 350 on the first substrate 310 to form the horizontal electric field by predetermined regions.

The first electrode 340 and the second electrode 350 may be constructed in various patterns. For example, a plurality of pattern units 342 and 352 may be formed at the first and second electrodes 340 and 350, respectively (as shown in FIG. 4). Each of the pattern units 342 and 352 may be constructed so that a plurality of fine patterns 344 may extend therefrom.

In an example embodiment, a pair of pattern units 342 of the first electrode 340 may be adjacent to each other. Each of the pattern units 342 may include fine patterns 344, which may be alternately arranged. Further, the pattern unit 342 of the first electrode 340 and the pattern unit 352 of the second electrode 350 may be adjacent thereto, and the fine patterns 344 and 354 of the pattern units 342 and 352 may be alternately arranged.

Accordingly, because the horizontal electric field may not be applied between the pair of pattern units 342 of the first electrodes 340 and the fine pattern 344 (in which a same power source may be applied), the liquid crystal layer 330 disposed at an upper unit thereof may not be distorted. As a result, light may directly pass through the liquid crystal layer 330, and the region may function as a slit.

Further, when the horizontal electric field is applied between the pattern units 342 and 352 of the first electrode 340 and the second electrode 350 and the fine patterns 344 and 354, the liquid crystal layer 330 may be distorted. Accordingly, light may not pass through the liquid crystal layer 330, i.e., may be blocked, and the region may function as a barrier.

Referring to FIG. 4, the first substrate 310 may be divided into a first region 420 and a second region 440 when a predetermined voltage is applied between the first electrode 340 and the second electrode 350 to form the horizontal electric field. The first region 420 may function as a barrier and the second region 440 may function as a slit. The first region 420 and the second region 440 may be arranged at a predetermined interval.

In an example embodiment, the pattern unit 342 of the first electrode 340 and the pattern unit 352 of the second electrode 350, and fine patterns 344 and 354 may be alternately arranged at the first region 420. The pattern unit 352 of the second electrode 350 may be adjacent to the pattern unit 342 of the first electrode 340. The fine patterns 344 and 354 may extend from each of the pattern units 342 and 352. Different potentials may be applied to the first electrode 340 and the second electrode 350, respectively, to form the horizontal electric field. Accordingly, the liquid crystal disposed at an upper portion of the first region 420 may be distorted by the horizontal electric field so that light may not pass through the liquid crystal layer 330, e.g., the first region 420 may function as a barrier.

Further, a pair of first electrode pattern units 342 and the fine patterns 344 extending from the pattern units 342 may be alternately arranged at the second region 440. A same potential may be applied to the first electrode 340 to have a potential difference of zero. Accordingly, because the horizontal electric field may not be formed, the liquid crystal disposed at an upper portion of the second region 440 may not be distorted such that light may pass through the liquid crystal layer 330, e.g., the second region may function as a slit.

The first electrode 340 disposed at the second region 440 functioning as the slit may not be formed with a wide pattern. Further, the pair of pattern units 342 of the first electrode 340 being adjacent thereto and a fine pattern 344 of each pattern unit may be alternately arranged. This arrangement may reduce a total resistance of an electrode formed on the first substrate 310.

Further, in the barrier panel 300, the region of the liquid crystal 330 distorted by the horizontal electric field may function as a barrier, and the non-distorted region of the liquid crystal 330, which may not be influenced by the horizontal electric field, may function as a slit to display 3D images. When the barrier panel 300 operates to display 3D, it may obtain the same effects as in the case when the slit and the barrier are alternately and vertically arranged.

Furthermore, the barrier panel 300 may also display 2D images of a wide viewing angle or a narrow viewing angle according to whether or not a vertical electric field may be applied to electrodes included in the first substrate 310 and the second substrate 320, e.g., between the first and second substrates 310 and 320.

That is, when the predetermined electric field is not applied to the first and second substrates 310 and 320 of the barrier panel 300, the liquid crystal formed in the barrier panel 300 may be arranged corresponding to the transmission axis of the polarizing plate (not shown) included on the image panel 200 to embody a wide viewing angle with respect to 2D images.

Further, when the predetermined electric field, e.g., a vertical field may be applied to the first and second substrates 310 and 320 of the barrier panel 300, the liquid crystal may be vertically distorted at a predetermined angle, so that an average slope of the liquid crystal in a slope direction may form approximately 45 degrees with respect to the transmission axis of the polarizing plate. The polarizing plate may be included on the image panel 200 to have a front surface of normally white characteristics so that the observer may view images. However, in a narrow viewing angle, the observer may not view the images because black images appear in the inclined direction.

As described earlier, the optimal range of the phase delay value may be calculated by an equation of $\Delta n * d$ to embody a more effective narrow viewing angle mode with the 2D images. When the phase delay value $\Delta n * d$ ranges from approximately 700 to 800 nm, an optimal narrow viewing angle mode may be embodied.

Figure 5:
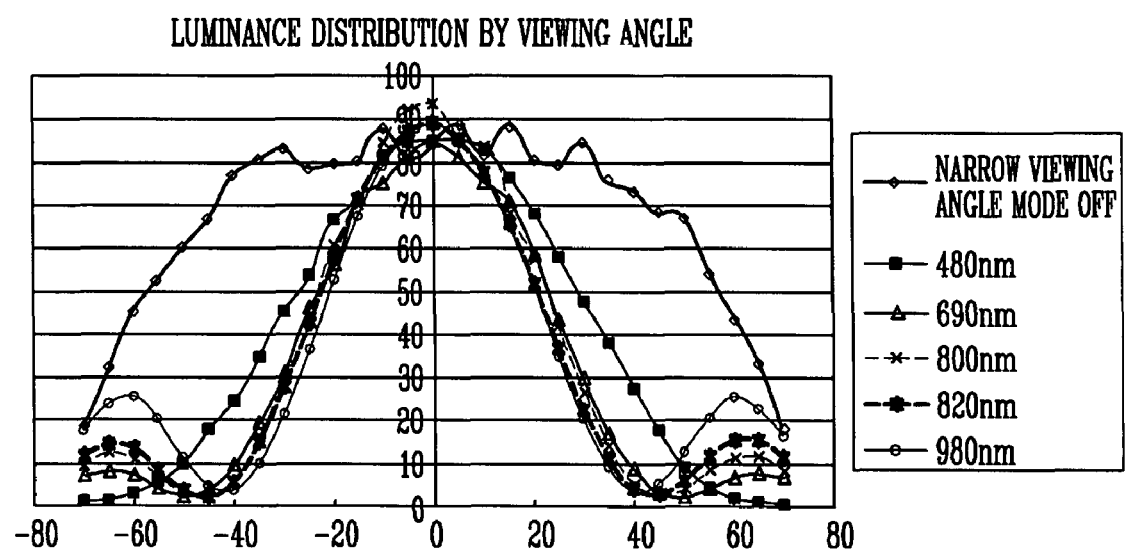
FIG. 5 illustrates a graph of a luminance distribution by viewing angles when a 2D image is embodied according to an example embodiment.

FIG. 5 illustrates a graph of a luminance distribution by viewing angles when 2D images are embodied according to an example embodiment.

Referring to FIG. 5, when a narrow viewing angle mode is in an OFF mode, e.g., when a vertical electric field is not applied in order to embody a wide viewing angle mode, the liquid crystal layer 330 formed in the barrier panel 300 may be arranged corresponding to a penetrating axis of a polarizing plate (not shown) included on the image panel 200 to embody a wide viewing angle with respect to 2D images.

Further, when the narrow viewing angle mode is in an ON mode, e.g., when the vertical electric field is applied to the first and second substrates 310 and 320 and the phase delay value $\Delta n * d$ may range from approximately 700 to 800 nm, the barrier panel may have approximately 5% luminance reduction effect of an entire surface in a viewing angle of approximately 45 degrees. As a result, the phase delay value may be suitable to embody 2D narrow viewing angle. The phase delay value $\Delta n * d$ may be a product of a double refraction value $\Delta n$ of a liquid crystal constituting the liquid crystal layer and a cell gap d between the first and second substrates.

When the phase delay value is less than approximately 700 nm, the luminance reduction effect may be slight in a viewing angle of approximately 45 degrees. When the phase delay value is equal to or greater than approximately 800 nm, the luminance distribution may be increased at a viewing angle greater than approximately 45 degrees. As a result, the phase delay value may not be suitable to embody a 2D narrow viewing angle mode, e.g., the phase delay value may be less than approximately 700 nm or greater than approximately 800 nm.

Figure 6A:
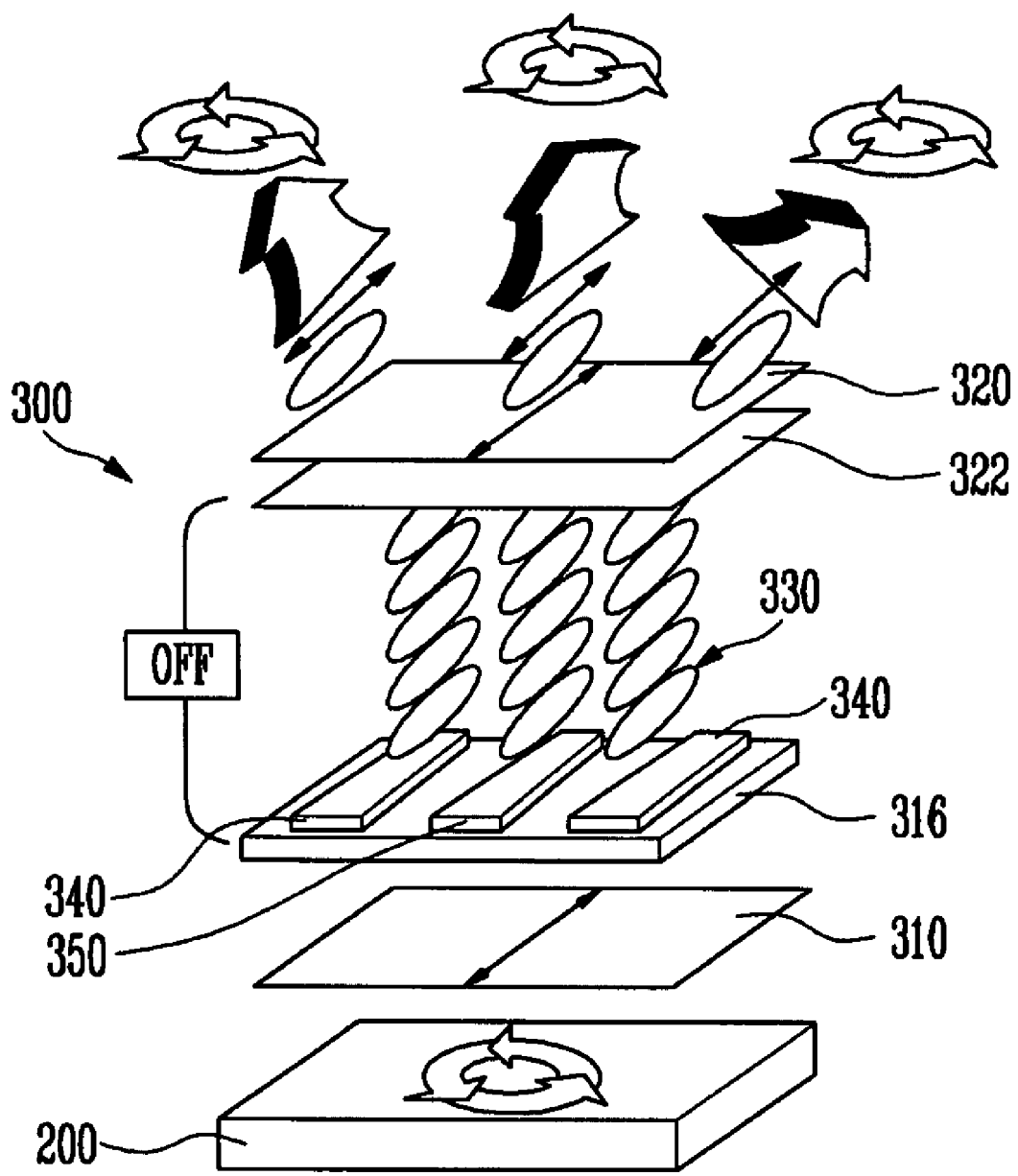
FIGS. 6A through 6C illustrate schematic perspective views of operating the display device according to an example embodiment.
Figure 6B:
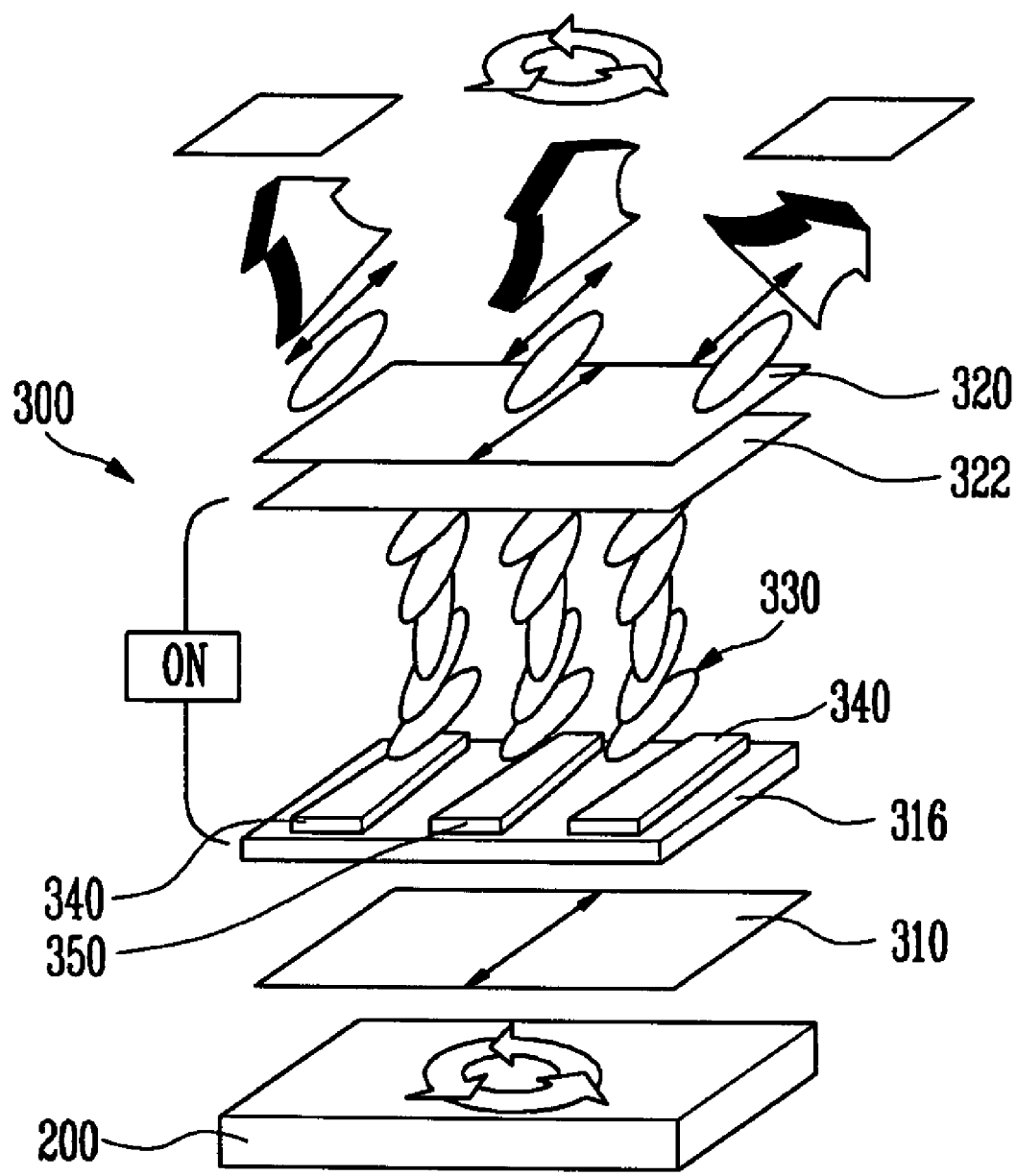
Figure 6C:
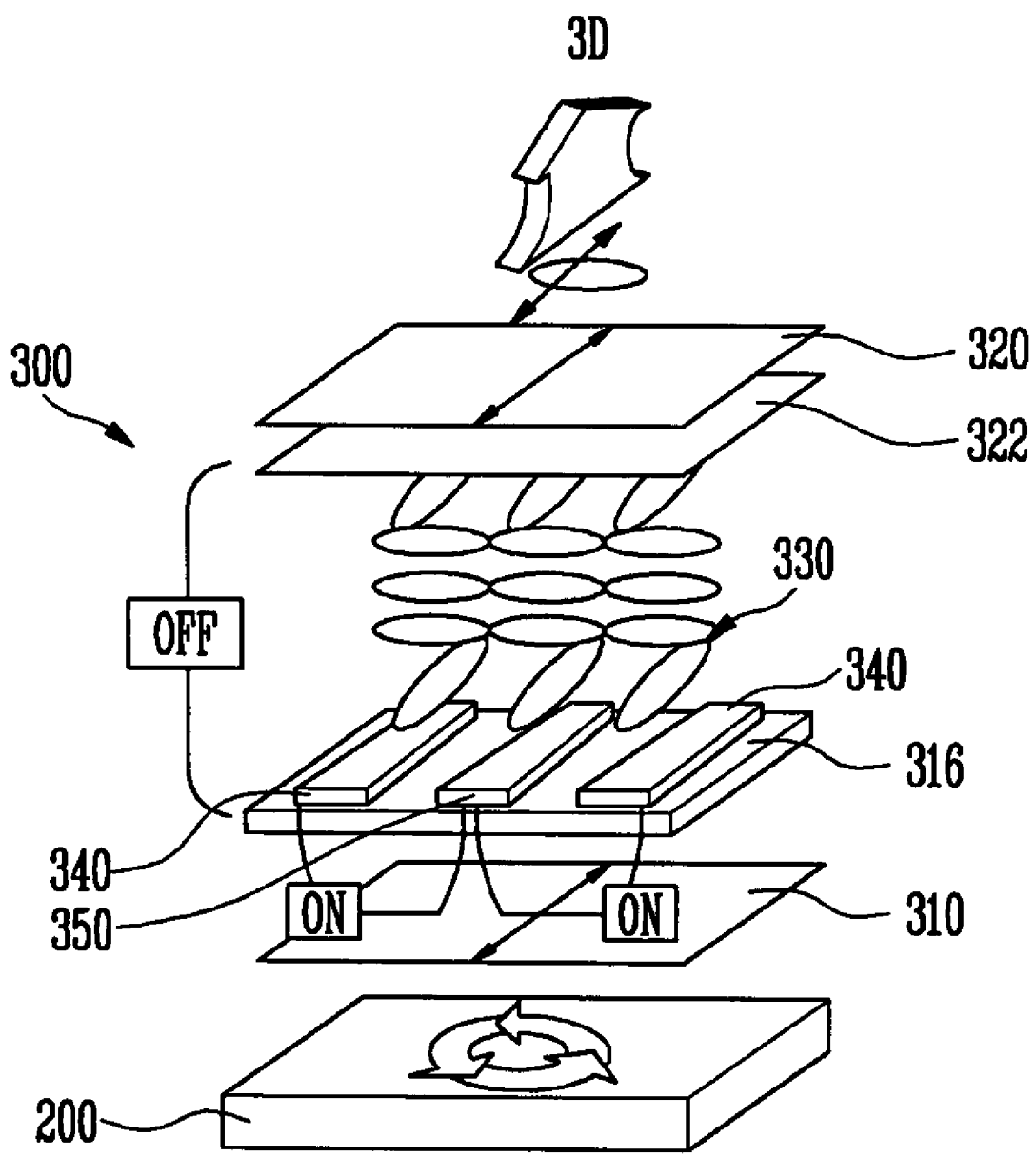

FIGS. 6A through 6C illustrate schematic perspective views of operating the display device according to an example embodiment.

FIG. 6A illustrates a 2D display mode state in which a wide viewing angle is embodied; FIG. 6B illustrates a 2D display mode state in which a narrow viewing angle is embodied; and FIG. 6C illustrates a 3D display mode state.

Referring to FIG. 6A, a predetermined voltage may not be applied between the first and second substrates 310 and 320 of the barrier panel 300, and between the first and second electrodes 340 and 350 formed on the first substrate 310, e.g., a vertical electric field may not be formed between the first and second substrates 310 and 320. Further, the vertical electric field may not be formed on the second substrate 320.

Accordingly, because the liquid crystal layer 330 inside the barrier panel 300 may not receive any forces in an initial orientation state, the liquid crystal layer 330 may maintain the initial orientation state. Thus, the liquid crystal layer 330 formed in the barrier panel 300 may be arranged corresponding to the transmission axis of the polarizing plate included on the image panel 200 to embody a wide viewing angle with respect to 2D images.

Referring to FIG. 6B, the predetermined voltage may be applied between the first and second substrates 310 and 320 of the barrier panel 300, and the predetermined voltage may not be applied between the first and second electrodes 340 and 350 formed on the first substrate 310, e.g., as the vertical electric field is applied to the first and second substrates 310 and 320, the liquid crystal layer 330 may be vertically distorted at a predetermined angle, so that an average slope of the liquid crystal may form approximately 45 degrees with the transmission axis of the polarizing plate included on the image panel 200.

Accordingly, a front surface of the barrier panel 330 may normally maintain white characteristics so that the observer may view an image. Black image may appear at a side of the barrier panel 330, e.g., in a slope direction so that a narrow viewing angle may be embodied in which an observer may not view the images.

However, as described with reference to FIG. 5, in order to optimize the narrow viewing angle mode of the 2D images, the phase delay value Δn*d may range from approximately 700 to 800 nm. The phase delay value Δn*d may be a product of a double refraction value Δn of a liquid crystal constituting the liquid crystal layer 330, and a cell gap d between the first and second substrates 310 and 320.

Referring to FIG. 6C, the predetermined voltage may be applied between the first and second substrates 310 and 320 of the barrier panel 300 so as to not form a vertical electric field, and the predetermined voltage may not be applied between the first and second electrodes 340 and 350 formed on the first substrate 310 to form a horizontal electric field, e.g., the horizontal electric field may be formed on the first substrate 310, so that the first substrate has a region of a liquid crystal layer 330 distorted by the horizontal electric field at predetermined intervals. Accordingly, the region of the liquid crystal layer 330 distorted by the horizontal electric field may function as a barrier, and the region of the liquid crystal layer 330 not distorted by the horizontal electric field may function as a slit to display 3D images. In other words, when the barrier panel 300 displays 3D images, the slit and the barrier may be vertically formed in an alternating manner.

Therefore, the barrier panel 300 may selectively display 2D or 3D images according to whether or not a predetermined potential difference is applied to an IPS type electrode included on the second substrate 320.

Accordingly, during 2D display operation, a user's selection may allow a display of wide viewing angle or narrow viewing angle to be embodied. Further, the user may also select to change the display to a 3D display mode.

Further, when the 2D images of narrow viewing angle is displayed through the display device, a phase delay value Δn*d of the barrier panel 300 may be optimized to embody a more effective narrow viewing angle mode.

Example embodiments of the present invention have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A multi-dimensional image selectable display device, comprising:
    an image panel adapted to output an image; and
    a barrier panel at an upper-side portion of the display device adapted to display the image as a two dimensional image or a three dimensional image, the barrier panel includes:
        a first substrate having a first electrode and a second electrode adapted to generate a horizontal electric field between the first and second electrodes;
        a second substrate having a transparent electrode adapted to generate a vertical electric field between the first and second substrates; and
        a liquid crystal layer between the first and second substrates, wherein:
    the barrier panel has at least three modes, a three dimensional image mode, a two dimensional image of a wide viewing angle mode, and a two dimensional image of a narrow viewing angle mode; and
    the barrier panel is adapted to have the two dimensional image of the narrow viewing angle mode when the vertical electric field is generated between the first and second substrates to distort liquid crystals of the liquid crystal layer at a predetermined angle such that a phase delay value Δn*d ranges from approximately 700 to 800 nm, the phase delay value Δn*d being a product of a double refraction value Δn of a liquid crystal constituting the liquid crystal layer and a cell gap d between the first and second substrates.

2. The multi-dimensional image selectable display device as claimed in claim 1, wherein the first electrode includes a plurality of first pattern units, each of the first pattern units is divided into a plurality of first fine patterns, and the second electrode includes a plurality of second pattern units, each of the second pattern units is divided into a plurality of second fine patterns.

3. The multi-dimensional image selectable display device as claimed in claim 2, wherein a pair of pattern units of the first electrode is adjacent to each other so that the first fine patterns of each pattern unit are alternately arranged.

4. The multi-dimensional image selectable display device as claimed in claim 3, wherein, when the horizontal electric field is not applied between the pair of pattern units of the first electrode and the first fine pattern, the liquid crystals disposed at an upper part thereof are not distorted such that light is allowed to pass through the liquid crystal layer.

5. The multi-dimensional image selectable display device as claimed in claim 2, wherein the first pattern unit of the first electrode and the second pattern unit of the second electrode are adjacent to each other and the first and second fine patterns of the first and second electrodes are alternately arranged.

6. The multi-dimensional image selectable display device as claimed in claim 5, wherein when the horizontal electric field is applied between the first and second pattern units and the first and second fine patterns, the liquid crystals disposed at an upper part thereof are distorted so as to block light.

7. The multi-dimensional image selectable display device as claimed in claim 1, wherein the transparent electrode being adapted to switch of the barrier panel between the two dimensional image of the wide viewing angle mode and the two dimensional image of the narrow viewing angle mode.

8. The multi-dimensional image selectable display device as claimed in claim 1, wherein the first substrate is divided into a first region functioning as a barrier and a second region functioning as a slit when the horizontal electric field is generated.

9. The multi-dimensional image selectable display device as claimed in claim 8, wherein the first region and the second region are arranged at intervals.

10. The multi-dimensional image selectable display device as claimed in claim 1, wherein the barrier panel includes a first orientation film and a second orientation film, the first and second orientation films being formed at inner sides of the first and second substrates, respectively.

11. The multi-dimensional image selectable display device as claimed in claim 10, wherein the first and second orientation films are adapted to be anti-parallel rubbed to initially orient the liquid crystal layer in an electrically controlled birefringence mode.

12. The multi-dimensional image selectable display device as claimed in claim 1, wherein the image panel is embodied by at least one of a liquid crystal display device, a plasma display panel device, and an organic light emitting display device, and the barrier panel is on a surface of the image panel adapted to output the image.

13. The multi-dimensional image selectable display device as claimed in claim 1, wherein the barrier panel selectively displays two and three dimensional images according to whether a potential difference is applied to the first and second electrodes of the first substrate to generate the horizontal electric field.

14. The multi-dimensional image selectable display device as claimed in claim 13, wherein the three dimensional image is displayed when the horizontal electric field is generated.

15. The multi-dimensional image selectable display device as claimed in claim 1, wherein the vertical electric field distorts the liquid crystals at an angle.

16. The multi-dimensional image selectable display device as claimed in claim 15, wherein the angle is approximately 45 degrees.

17. The multi-dimensional image selectable display device as claimed in claim 1, wherein:

the barrier panel is adapted to have the three dimensional image mode when the horizontal electric field is generated between the first and second electrodes; and the barrier panel is adapted to have the two dimensional image of the wide viewing angle mode in the absence of the horizontal electric field and the vertical electric field.

18. The multi-dimensional image selectable display device as claimed in claim 17, wherein the at least three modes are each different configurations of the liquid crystal layer.

19. The multi-dimensional image selectable display device as claimed in claim 1, wherein the barrier panel is adapted to have the two dimensional image of the narrow viewing angle mode when the liquid crystal in the liquid crystal layer are arranged in a slope direction of about 45 degrees with respect to a transmission axis of an underlying polarizing plate on the image panel.

20. A multi-dimensional image selectable display device, comprising:

a barrier panel at an upper-side portion of the display device so as adapted to display the image as a two dimensional image or a three dimensional image, the barrier panel includes:

a first substrate having a first electrode and a second electrode adapted to generate a horizontal electric field between the first and second electrodes;

a second substrate having a transparent electrode adapted to generate a vertical electric field between the first and second substrates; and a liquid crystal layer between the first and second substrates, wherein:

the barrier panel has at least three modes, a three dimensional image mode, a two dimensional image of a wide viewing angle mode, and a two dimensional image of a narrow viewing angle mode; and the barrier panel is adapted to have the two dimensional image of the narrow viewing angle mode when a predetermined electric field is generated between the electrodes of the first and second substrates to distort liquid crystals of the liquid crystal layer at a predetermined angle such that a phase delay value $\Delta n*d$ ranges from approximately 700 to 800 nm, the phase delay value $\Delta n*d$ being a product of a double refraction value $\Delta n$ of a liquid crystal constituting the liquid crystal layer and a cell gap d between the first and second substrates.

* * * * *